United States Patent [19]

Nagata et al.

[11] Patent Number: 5,302,306
[45] Date of Patent: Apr. 12, 1994

[54] PROCESS FOR PREPARING POLYCRYSTALLINE FERRITE MATERIALS AND COMPOSITES CONTAINING THEM

[75] Inventors: Shinji Nagata, Kanagawa; Norio Sasaki; Mineo Yorizumi, both of Miyagi, all of Japan

[73] Assignee: Sony Corporation, Tokyo, Japan

[21] Appl. No.: 78,843

[22] Filed: Jun. 21, 1993

Related U.S. Application Data

[62] Division of Ser. No. 851,337, Mar. 16, 1992, abandoned.

[30] Foreign Application Priority Data

| | | | |
|---|---|---|---|
| Mar. 15, 1991 | [JP] | Japan | 3-075576 |
| Mar. 15, 1991 | [JP] | Japan | 3-75577 |
| Aug. 3, 1991 | [JP] | Japan | 3-217813 |
| Aug. 30, 1991 | [JP] | Japan | 3-244998 |

[51] Int. Cl.$^5$ ............................................. C04B 35/38
[52] U.S. Cl. ........................... 252/62.62; 204/164; 264/25; 264/27; 264/65; 423/594
[58] Field of Search .......... 252/62.62; 423/594; 204/164; 264/25, 27, 65

[56] References Cited

U.S. PATENT DOCUMENTS

| | | | |
|---|---|---|---|
| 3,542,685 | 11/1970 | Iwase et al. | 252/62.62 |
| 3,822,210 | 7/1974 | Iwase et al. | 252/62.62 |
| 3,836,472 | 9/1974 | Soejima et al. | 252/62.62 |
| 3,843,541 | 10/1974 | Chiba et al. | 252/62.62 |
| 4,372,865 | 2/1983 | Yu et al. | 252/62.62 |
| 4,559,312 | 12/1983 | Kim et al. | 264/65 |
| 4,680,130 | 7/1987 | Hibst et al. | 252/62.62 |
| 4,719,078 | 1/1988 | Miyashita et al. | 204/164 |

FOREIGN PATENT DOCUMENTS

| | | | |
|---|---|---|---|
| 0219231 | 4/1987 | European Pat. Off. | |
| 1471428 | 3/1969 | Fed. Rep. of Germany | 252/62.62 |
| 51-11810 | 1/1976 | Japan | 252/62.62 |
| 57-27980 | 2/1982 | Japan | 252/62.62 |
| 59-64531 | 4/1984 | Japan | 423/594 |
| 59-141499 | 8/1984 | Japan | 423/594 |
| 60-141669 | of 1985 | Japan | |
| 1-152707 | 6/1989 | Japan | 252/62.62 |
| 2-109306 | 4/1990 | Japan | 252/62.62 |
| 3-285001 | 12/1991 | Japan | |

*Primary Examiner*—Jack Cooper
*Attorney, Agent, or Firm*—Hill, Steadman & Simpson

[57] ABSTRACT

A ferrite composed of a polycrystalline ferrite which is obtained by sintering a ferrite starting powder by a discharge plasma technique is described. The ferrite starting powder is appropriately a coprecipitated ferrite powder. Prior to the sintering, the coprecipitated powder is preferably thermally treated or calcined at temperatures of not lower than 900° C. A composite ferrite is also described, which is composed of the polycrystalline ferrite and a single crystal ferrite bonded together obtained by contacting the single crystal ferrite with the coprecipitated ferrite powder or embedding the single crystal ferrite in the powder, under which the polycrystalline ferrite powder is sintered by the discharge plasma sintering thereby bonding both ferrites together.

4 Claims, 3 Drawing Sheets

PROCESS FOR PREPARING POLYCRYSTALLINE FERRITE MATERIALS AND COMPOSITES CONTAINING THEM

This is a division of application Ser. No. 07/851,337, filed Mar. 16, 1992, now abandoned.

BACKGROUND OF THE INVENTION

1. Field of the Invention

This invention relates to ferrite materials which are suitably used in electronic parts typical of which are electroceramics and which have good high frequency characteristics.

2. Description of the Prior Art

In recent years, there is a great tendency toward miniaturization and high performance of electronic appliances. Similar tendencies are shown toward various parts constituting the electronic appliances and also various materials therefor. For instance, with ferrites which are essential for switching power sources, magnetic heads and the like, there is a demand of the development of materials which have better high frequency characteristics in order to achieve miniaturization of the SW power sources and the high performance of the magnetic head.

Examples of ferrites having a small size and good high frequency characteristics include polycrystalline products which are obtained, for example, by subjecting aqueous solutions of starting materials to wet coprecipitation reaction to obtain fine particles of a coprecipitation ferrite material and then the fine particles to sintering. Since the coprecipitation ferrite material has a spinel phase, any calcination technique is not necessary, unlike known ceramic processes. The sintered product can be obtained by a simple process including drying, molding and sintering, coupled with another advantage that the a uniform composition is obtained, thus the coprecipitation ferrite material being suitable for use as a starting powder for ferrites.

However, where ferrites are prepared from the coprecipitation ferrite material, the spinel crystals are apt to be decomposition at the time of the sintering, thereby presenting the problem that the resultant final product has fine cracks involved therein, with mechanical durability and magnetic characteristics being degraded.

In order to obtain ferrites having good characteristics from the starting coprecipitation ferrite materials, it has been considered necessary to resort to a specific sintering procedure. For instance, there are known techniques which are disclosed in Japanese Laid-open Patent Application Nos. 60-141669 and 1-152707. The procedure set out in the Japanese Laid-open Patent Application No. 60-141669 includes heating in an atmosphere of a mixed gas of $N_2$ and $H_2$ gases at a given heating rate and then sintering. The procedure of Japanese Laid-open Patent Application No. 1-152707 includes sintering in vacuum or in an atmosphere of an inert gas such as $N_2$ gas or $H_2$ gas at a given heating rate. Moreover, Japanese Laid-open Patent Application No. 63-252929 sets forth a procedure wherein the content of divalent iron in starting materials is properly controlled to suppress pores from being formed at the time of the thermal treatment, ensuring forming of a high density product.

However, these procedures should require complicated steps such as of using a specific type of sintering atmosphere and severe control of the heating rate, thus being not satisfactory with respect to the productivity and mass-production.

On the other hand, with magnetic heads such as video heads, single crystal ferrite heads have now been changed to composite magnetic heads made of single crystal ferrites and polycrystalline ferrites in order to reduce sliding noises and to improve the CN ratio. The composite magnetic head has a single crystal ferrite having a high saturation magnetization flux density at the side of a front gap and a polycrystalline ferrite having a high permeability at the side of a back gap. This type of head is advantageous in that although simple in structure, the head shows good electromagnetic conversion efficiencies and is enabled for high density recording.

The composite ferrite used as the magnetic core of the composite magnetic head is obtained, for example, by preparing both a single crystal ferrite and a polycrystalline ferrite and hot pressing both ferrites. Thus, the known process of fabricating a composite ferrite requires a number of steps, thus being very disadvantageous from the standpoint of reduction of the production costs.

SUMMARY OF THE INVENTION

It is accordingly an object of the invention to provide a polycrystalline ferrite or a composite ferrite which is satisfactory with respect to productivity and mass producibility.

It is another object of the invention to provide ferrite particles having a small size which have good high frequency characteristics and which are obtained by sintering by discharge plasma sintering without resorting to severe control of a heating rate at the time of sintering and any specific type of gas atmosphere.

It is a further object of the invention to provide a composite ferrite wherein a polycrystalline ferrite powder and a single crystal ferrite material are bonded together during the course of hot pressing, thereby significantly simplifying the production process and thus leading to a cost reduction.

The above objects can be achieved, according to the invention, by a ferrite which comprises a polycrystalline ferrite obtained by sintering a starting ferrite powder by a discharge plasma technique.

According to the invention, there is also provided a composite ferrite which comprises a single crystal ferrite and a polycrystalline ferrite powder bonded together by a technique which comprises providing a starting ferrite powder and subjecting the starting powder to discharge plasma sintering while contacting with a single crystal ferrite material whereby the resultant sintered product has polycrystalline ferrite powder and the single crystal material bonded together.

DETAILED DESCRIPTION AND EMBODIMENTS OF THE INVENTION

Figure 1:
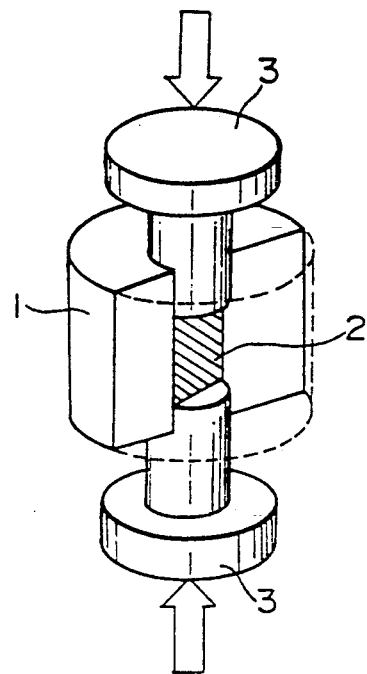
FIG. 1 is a schematic perspective view illustrating a discharge plasma sintering technique.

The polycrystalline ferrite particles of the present invention are those which are obtained by subjecting coprecipitation ferrite particles to a discharge plasma sintering, by which it becomes unnecessary to use a specific type of sintering atmosphere and to severely control a heating rate at the time of sintering. The resultant particles are fine and have good high frequency characteristics. The sintered product can be produced within a very short time. Moreover, when the discharge plasma sintering is effected such that the coprecipitation ferrite particles are in contact with or are embedded with a single crystal ferrite material, there can be obtained a composite ferrite composed of polycrystalline ferrite particles and the single crystal ferrite bonded together after sintering and compressing.

The starting ferrite powder may be any known ones including those which are prepared by solid phase reaction. It is preferred in the practice of the invention to use coprecipitation ferrite powders prepared by coprecipitation reaction in an aqueous solution. The coprecipitation ferrite material is prepared from water-soluble salts such as of $Mn^{2+}$, $Zn^{2+}$, $Fe^{2+}$, $Fe^{3+}$ and the like by coprecipitation reaction wherein an alkaline solution is added to an aqueous solution whose composition has a controlled formulation of the water-soluble salts, or by oxidation reaction of the coprecipitation product.

The water-soluble salts are not critical and include, for example, sulfates, hydrochlorides and the like.

In general, it is known that metal oxides have hydroxyl groups (OH groups) on the surfaces thereof. The number of hydroxyl groups on the surfaces greatly depends on the preparation conditions of the metal oxide for the same metal oxide composition.

The coprecipitation ferrite material or powder used in the present invention is provided as a starting material. The coprecipitation ferrite material have a great number of hydroxyl groups on the surfaces thereof which greatly influence the fine structure when sintered.

More particularly, the coprecipitation ferrite powder used in the invention is molded and sintered to obtain a sintered product. At the time of the sintering, the starting particles are contacted with one another whereupon the hydroxyl groups in or on the surfaces of the particles undergo dehydration condensation reaction around the contact portions thereof, as is particularly shown in the following formula (1), thereby causing initial melt bonding of the particles to proceed $$1 \qquad (1)$$

However, if the initial melt bonding proceeds too fast, relatively great voids are left and surrounded by the particles. The void does not disappear during the course of the sintering, so that the resultant sintered product has a number of voids therein. In order to produce a sintered product with a high density, it is essential that formation of such voids as mentioned above be suppressed to a minimum at the initial stage of the sintering. To this end, it is considered effective to reduce the number of the surface hydroxyl groups of the coprecipitation ferrite material so that the melt bonding between the particles at the initial sintering stage does not proceed too fast.

For controlling the surface states such as the number of the surface hydroxyl group, several methods may be used including a method of immersion in an acidic aqueous solution or a method of immersion in an alkaline aqueous solution.

However, with the method of the immersion in an acidic aqueous solution, the acid, HX, is adsorbed to the surface hydroxyl group as shown in the following formula (2), so that on the way of the sintering, the acid, HX, is relatively easily dissociated such as by a thermal decomposition reaction, returning to the original surface hydroxyl groups. In this sense, the immersion in an acidic aqueous solution is not satisfactory.

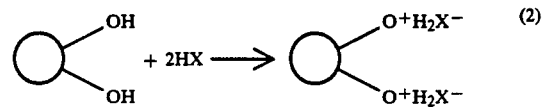

wherein X is $Cl^-$, $SO_4^{2-}$ or the like.

On the other hand, in the method of the immersion in an alkaline aqueous solution, it is necessary that water ($H_2O$) be present in order to reproduce the surface hydroxyl group, as is particularly shown in the formula (3), so that the decomposition reaction does not proceed readily.

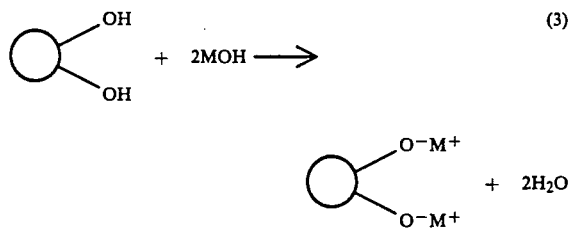

wherein M is $Li^+$, $Mg^{2+}$ or the like.

Thus, it becomes possible to produce a high density sintered ferrite by immersing the coprecipitation ferrite material in an alkaline aqueous solution.

The ferrite of the invention is obtained by molding a starting ferrite powder and subjecting the resulting molding to sintering by a discharge plasma sintering technique.

The discharge plasma sintering technique is a novel sintering technique utilizing a discharge plasma for the sintering reaction. The discharge plasma sintering technique is described with reference to FIG. 1. In the figure, a starting ferrite powder 2 is placed in a heat-resistant, high-impact cylindrical mold 1 having openings at opposite sides thereof. Electrodes 3,3 each having a projection capable of being inserted into the opening of the mold 1 are inserted through the respective openings as shown. By the insertion, a given compression pressure is applied to the starting ferrite powder 2. Subsequently, an appropriate potential is applied between the electrodes 3,3 to cause a discharge plasma to occur therebetween. By this, the surfaces of the starting ferrite powder 2 are activated and heated by application of the electric current, thus leading to sintering. The sintering of the starting ferrite powder 2 by the discharge plasma sintering technique enables one to obtain a bulk sintered product within a very short time of from 2 to 3 minutes.

It is preferred that prior to the sintering of the starting ferrite powder by the discharge plasma sintering technique, the powder is thermally treated at temperatures of not lower than 900° C. By the thermal treatment, the resultant polycrystalline ferrite is remarkably improved in magnetic characteristics. The treating time is not critical and should preferably be properly selected. If the thermal treatment temperature is lower than 900° C., good results cannot be expected.

In the sintering step by the discharge plasma sintering technique, there may be obtained not only the polycrystalline sintered ferrite product as stated above, but also a composite ferrite product composed of the polycrystalline ferrite particles and a single crystal ferrite material which have been bonded together. In the latter case, the discharge plasma sintering technique is so performed that the single crystal ferrite material is in contact with or is embedded in the starting particles. By this, the fabrication step becomes very simplified with a reduction of fabrication costs. In addition, the polycrystalline ferrite and the single crystal ferrite material can be hot pressed at low temperatures within a short time, thus leading to the fact that a good interfacial separation between the polycrystalline and single crystal ferrites is ensured. Thus, the controlling properties of the interface, such as a very small degree of meandering at the interface, are improved.

Figure 2:
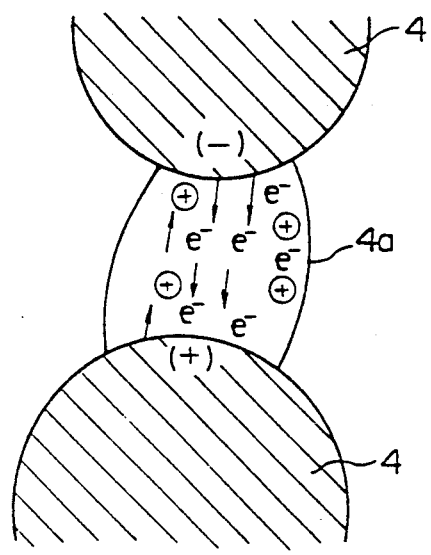
FIG. 2 is a schematic view illustrating the mechanism of a discharge plasma sintering reaction.

The discharge plasma sintering technique is principally described with reference to FIG. 2. When a potential is applied directly to the starting ferrite powder, micro discharge takes place in a space 4a between the powder particles 4, thereby causing a plasma. The oxide film and impurities such as adsorbed gases on the surface of the powder particles 4 are evaporated and removed by the action of the plasma, whereupon heat and strain energies are accumulated on the surfaces of the particles 4, thereby activating the particles 4. As a result, a number of spacial lattic points are produced, so that the diffusion constant of movement of the atoms is increased to several hundreds times greater than that of the ordinary state. At the same time, a Joule heat is generated among the particles 4 to cause active thermal diffusion. This is why the sintering can be completed within a very short time.

When a potential is applied under such conditions that a single crystal ferrite is in contact with the starting ferrite powder or is embedded in the ferrite powder, the plasma is generated between the starting ferrite particles and the single crystal ferrite according to the principle set forth above. These surfaces are activated to bond the particles and the single crystal ferrite at low temperatures within a short time.

The present invention is more particularly described by way of examples.

EXAMPLE 1

In this example, Mn-Zn ferrite starting powder which had been prepared by wet coprecipitation reaction in an aqueous solution was sintered by a discharge plasma sintering technique to obtain a polycrystalline ferrite.

Starting materials were first provided including an Fe material such as $FeSO_4 \cdot 7H_2O$, a Mn material such as $MnSO_4 \cdot 5H_2O$ and a Zn material such as $ZnSO_4 \cdot 7H_2O$. An aqueous solution containing $MnO:ZnO:Fe_2O_3 = 28:20:52$ was prepared. Potassium hydroxide was added to the aqueous solution as an alkaline ingredient so that the pH of the aqueous solution was adjusted to 11.

Subsequently, while agitating the aqueous solution sufficiently, potassium chlorate, $KClO_3$, was added as an oxidizing agent, followed by a reaction while keeping the reaction solution at a temperature of 100° C. for 1 hour. After completion of the reaction, the resultant reaction product was washed sufficiently with water, filtered and dried to obtain a fine powder of coprecipitated Mn-Zn ferrite.

2 g of the fine powder of the coprecipitated Mn-Zn ferrite was subjected to immersion treatment in a saturated aqueous solution of magnesium hydroxide, $Mg(OH)_2$, while sufficiently agitating at a temperature of 100° C. for 1 hour. The pH of the solution for the immersion treatment was lowered from a pH of 10 prior to the treatment to a pH of 8.5 after the treatment. From this, it was confirmed that the ferrite had been treated.

After completion of the immersion treatment, the fine powder of the coprecipitated Mn-Zn ferrite was filtered and dried to obtain a treated powder.

Thereafter, the thus treated fine powder of the coprecipitated Mn-Zn ferrite was calcined in an atmosphere of $N_2$ gas at 1000° C. for 2 hours. It was confirmed that during the calcination, from 10 to 20% of $\alpha$-hematite ($Fe_2O_3$) was formed.

The fine powder of the coprecipitated Mn-Zn ferrite was subjected to sintering in air for 5 minutes by a discharge plasma sintering technique to obtain a polycrystalline Mn-Zn ferrite. The sintering was effected under conditions of a compression pressure of 500 kgf/cm$^2$ and a current of 2000 A.

The polycrystalline Mn-Zn ferrite was then annealed in an atmosphere of $N_2$ gas at 900° C. for 6 hours.

The thus annealed polycrystalline Mn-Zn ferrite was subjected to an X-ray diffraction analysis to determine the particulate structure and the X-ray diffraction analysis reveals that although sintered in air, the ferrite was made of a spinel single phase and was so dense that its density was not less than 99% of the true density.

The polycrystalline Mn-Zn ferrite had such a particulate structure that its size was as small as 1 to 2 $\mu$m. In view of the fact that the time required before completion of the sintering reaction was as short as 5 minutes, it was considered that the polycrystalline Mn-Zn ferrite particles underwent little growth. These results were irrespective of the heating rate for the sintering.

In contrast, when the coprecipitated Mn-Zn ferrite fine powder was sintered by an ordinary sintering technique (Comparative Example 1), the resultant polycrystalline Mn-Zn ferrite had a size of 10 to 15 $\mu$m. Thus, a fine powder of the polycrystalline ferrite could not be obtained.

Figure 3:
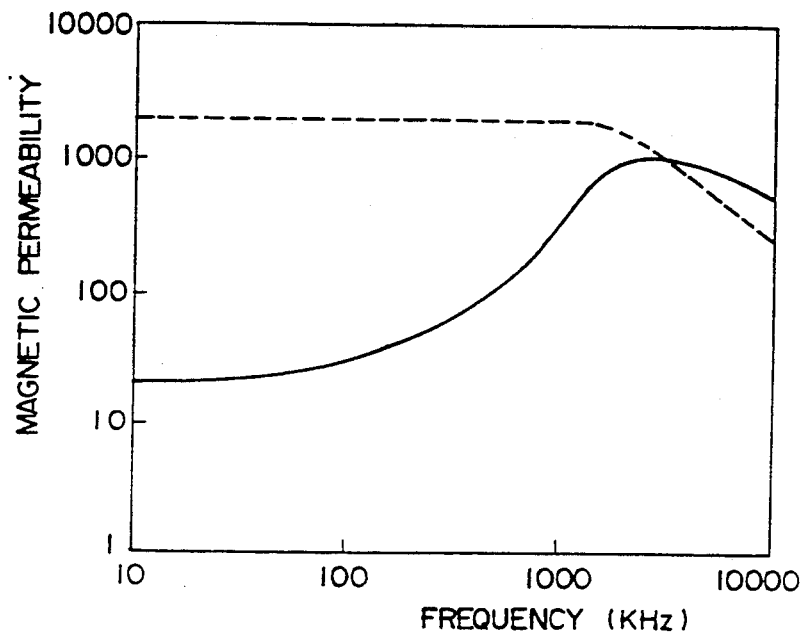
FIG. 3 is a graphical representation of the magnetic permeability in relation to the variation in frequency.
Figure 5:
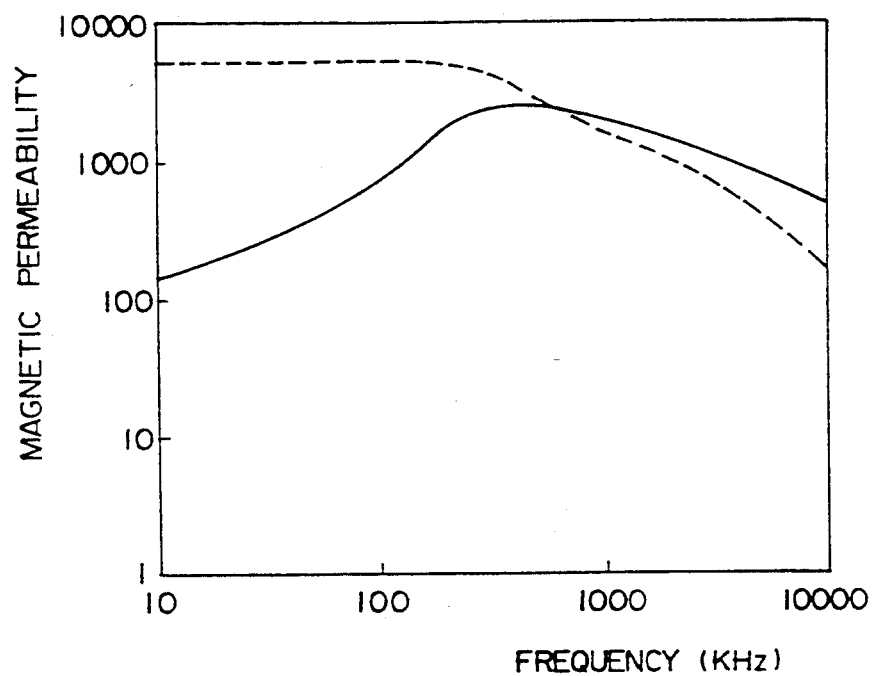
FIG. 5 is a graphical representation of the magnetic permeability in relation to the variation in frequency for polycrystalline ferrites obtained by ordinary sintering of coprecipitation ferrite materials.

The polycrystalline Mn-Zn ferrite powders of Example 1 and Comparative Example 1 were each used to make a ring-shaped sample with an outer diameter of 6 mm, an inner diameter of 3 mm and a thickness of 1 mm, followed by measurement of its magnetic permeability in relation to the variation in frequency. The results are shown in FIGS. 3 and 5. FIG. 3 shows a frequency dependence of the magnetic permeability of the sample using the polycrystalline Mn-Zn ferrite powder of the example. FIG. 5 shows a frequency dependence of the magnetic permeability of the sample using the polycrystalline Mn-Zn ferrite powder of the comparative example. In FIGS. 3 and 5, the broken line indicates a real number field ($\mu'$) when the magnetic permeability, $\mu$, is expressed as a complex number of $\mu = \mu' - j\mu$. This corresponds to an ordinary magnetic permeability (inductance). The solid line indicates the imaginary field ($\mu''$) corresponding to an energy loss. Ideally, this energy loss should preferably be as small as possible.

From FIGS. 3 and 5, it will be seen that while the sample of Comparative Example 1 increases the loss in a range over 100 kHz and is lowered in the magnetic permeability, the sample of the invention is small in the loss in the above range and keeps a high permeability in a high frequency range of 1000 kHz or over.

Moreover, the polycrystalline Mn-Zn ferrite powders obtained above, and another polycrystalline Mn-Zn ferrite powder (Comparative Example 2), which had been obtained by subjecting a known starting powder, instead of the coprecipitated Mn-Zn ferrite, to wet mixing, drying, calcination, milling, molding and then sintering by an ordinary sintering process as in Comparative Example 1, were subjected to measurement of a high frequency characteristic using a value of tan $\delta/\mu$ as an index. The results are shown in FIG. 4.

Figure 4:
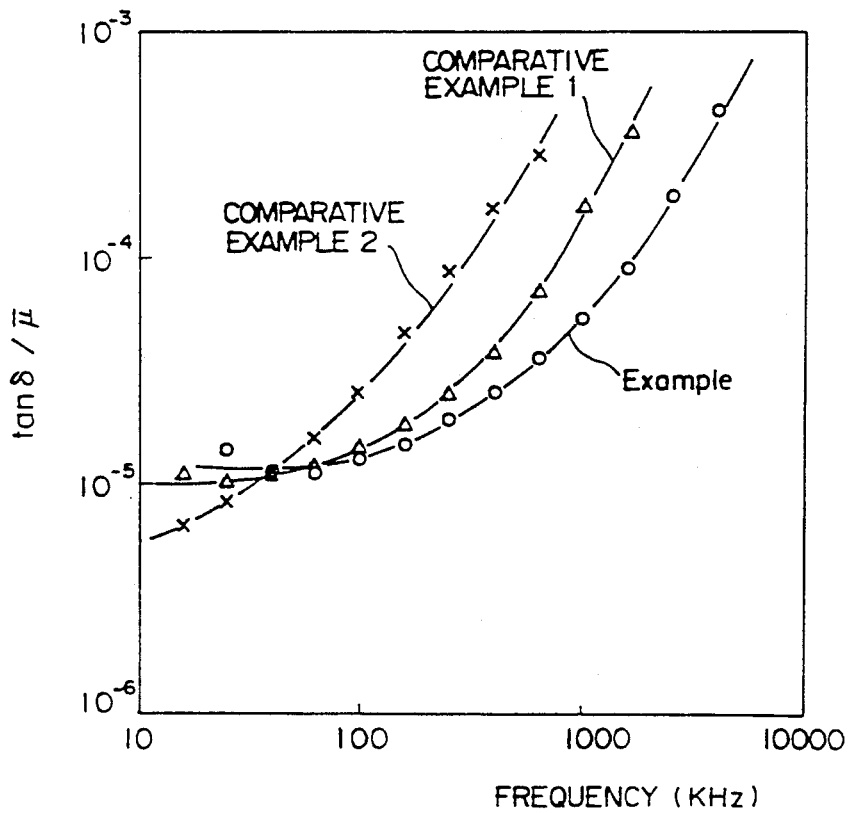
FIG. 4 is a graphical representation of the value of tan $\delta/\mu$ in relation to the variation in frequency for different types of polycrystalline ferrites of the invention and for comparison.

As will be apparent from FIG. 4, when the coprecipitated fine powder of the Mn-Zn ferrite is sintered by the discharge plasma sintering technique, the resulting sintered product has a good high frequency characteristic. It will be noted that when the starting powder as used in Comparative Example 2 was sintered by the discharge plasma sintering technique, the magnetic characteristics were poor and were not worth evaluation.

EXAMPLE 2

The coprecipitated Mn-Zn ferrite fine powder, which is obtained by a wet preparation process in the same manner as in Example 1, was thermally treated (calcined) under different treating conditions as indicated in the Table and subsequently subjected to the discharge plasma sintering technique to obtain polycrystalline ferrites. The relation between the thermal treating temperature and the magnetic characteristic of the ferrites was determined.

More particularly, a coprecipitated Mn-Zn ferrite fine powder was thermally treated in an atmosphere of $N_2$ gas under conditions indicated in the table.

Thereafter, the thus treated coprecipitated Mn-Zn ferrite fine powder was sintered by the discharge plasma sintering technique under the same conditions as used in Example 1 to obtain a polycrystalline Mn-Zn ferrite product.

The density of the thus obtained polycrystalline Mn-Zn ferrites was measured, with the result that the density was so high as to be not less than 99% of the true density.

These polycrystalline Mn-Zn ferrites were each used to make a ring-shaped sample having an outer diameter of 6 mm, an inner diameter of 3 mm and a thickness of 1 mm and subjected to measurement of magnetic permeability at a frequency of 1 MHz. The results are shown in the table in which those results using a ferrite which was not subjected to the thermal treatment are also shown.

TABLE

| Thermal Treatment Temperature (°C.) | Treating Time (hours) | Magnetic Permeability of Sample |
|---|---|---|
| 1000 | 2 | 770 |
| 900 | 20 | 630 |
| 800 | 20 | 70 |
| — | — | 50 |

As will be apparent from the above table, very high magnetic permeability can be obtained when the starting ferrite powder is pre-heated at temperatures not lower than 900° C. and then sintered by the discharge plasma sintering technique. In contrast, when the ferrite powder is not thermally treated or is thermally treated but at temperatures lower than 900° C., the permeability is very small and insufficient to ensure the satisfactory magnetic characteristic.

EXAMPLE 3

The Mn-Zn ferrite starting fine powder obtained in the same manner as in Example 1 was sintered by the discharge plasma sintering technique while bringing the powder into contact with a single crystal Mn-Zn ferrite material having the same composition as the starting fine powder, thereby bonding the polycrystalline Mn-Zn ferrite and the single crystal Mn-Zn ferrite together to form composite ferrite.

Initially, after preparation of a Mn-Zn ferrite starting powder by a wet process using the coprecipitation reaction in an aqueous solution in the same manner as in Example 1, the coprecipitated Mn-Zn ferrite fine powder was calcined in an atmosphere of $N_2$ gas at 1000° C. for 2 hours.

A single crystal Mn-Zn ferrite having the same composition as the coprecipitated Mn-Zn ferrite fine powder was prepared such as by the Bridgemann process. This ferrite was in contact with the coprecipitated Mn-Zn ferrite fine powder and subjected to discharge plasma sintering under a compression pressure. By the sintering, the coprecipitated Mn-Zn ferrite fine powder was converted into a polycrystalline Mn-Zn ferrite powder to obtain a composite ferrite composed of the single crystal Mn-Zn ferrite and the polycrystalline Mn-Zn ferrite bonded together.

Scanning-type electron microscopic observation of the interface between the bonded single crystal Mn-Zn ferrite and polycrystalline Mn-Zn ferrite revealed that the interfacial separation was very good with a very small degree of meandering at the interface.

As will be apparent from the foregoing description, the ferrite starting powder is sintered by the discharge plasma sintering technique, so that there can be obtained a ferrite powder having a small size with good high frequency characteristics without resorting to a specific type of atmosphere and severe control such as of a heating rate at the time of sintering.

Since the starting ferrite powder is sintered under a compression pressure, bonding with a single crystal ferrite is possible if such single crystal ferrite is placed in contact with the starting ferrite powder. This leads to an appreciably simplified production process and also to a cost reduction. In addition, the discharge plasma sintering technique is accomplished within a time as short as several minutes before completion of the sintering reaction, so that the separation between the polycrystalline ferrite and the single crystal ferrite at the interface is very good and a degree of meandering at the interface is very small.

In addition, the bonding between the polycrystalline and single crystal ferrites is possible at a very low temperature of approximately 900° C., thus leading to good productivity and mass-producibility and also to cost savings.

What is claimed is:

1. A process for preparing a polycrystalline Mn-Zn ferrite comprising coprecipitating Mn-Zn ferrite material from an aqueous solution; immersing the coprecipitant in an alkaline aqueous solution; separating the coprecipitant therefrom to form a starting powder; calcining the starting powder at a temperature not lower than 900° C.; placing the calcined starting powder in a mold and applying a compressive pressure thereto with electrodes inserted therein; and applying potential between the electrodes to cause a discharge plasma sintering of the compressed calcined starting powder to form polycrystalline Mn-Zn ferrite.

2. A process according to claim 1, wherein the calcining is effected at a temperature of 1000° C. in an atmosphere of $N_2$ and the polycrystalline Mn-Zn ferrite is annealed in $N_2$ at 900° C. after the plasma sintering.

3. A process for preparing a composite of polycrystalline Mn-Zn ferrite bonded to a single crystal of Mn-Zn ferrite comprising the steps of coprecipitating Mn-Zn ferrite material from an aqueous solution; immersing the coprecipitant in an alkaline aqueous solution; separating the coprecipitant therefrom to form a starting powder; calcining the starting powder at a temperature not lower than 900° C.; placing the calcined starting powder together with a single crystal of Mn-Zn ferrite of the same composition as the starting powder to form a mixture in a mold; applying a compressive pressure thereto with electrodes inserted therein; and applying potential between the electrodes to cause a discharge plasma sintering of the mixture to form said composite.

4. A process according to claim 3, wherein the calcining is effected at a temperature of 1000° C. in an atmosphere of $N_2$.

* * * * *